US012010470B2

(12) United States Patent
Sugaya

(10) Patent No.: US 12,010,470 B2
(45) Date of Patent: Jun. 11, 2024

(54) DATA PROCESSING SYSTEM, DATA PROCESSING METHOD, SENSOR APPARATUS, AND RECEIVING APPARATUS

(71) Applicant: SONY GROUP CORPORATION, Tokyo (JP)

(72) Inventor: Shigeru Sugaya, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 126 days.

(21) Appl. No.: 17/594,465

(22) PCT Filed: Apr. 6, 2020

(86) PCT No.: PCT/JP2020/015556
§ 371 (c)(1),
(2) Date: Oct. 18, 2021

(87) PCT Pub. No.: WO2020/217957
PCT Pub. Date: Oct. 29, 2020

(65) Prior Publication Data
US 2022/0201374 A1    Jun. 23, 2022

(30) Foreign Application Priority Data

Apr. 26, 2019   (JP) ................... 2019-085763

(51) Int. Cl.
*H04Q 9/00*         (2006.01)
*H04L 67/12*        (2022.01)

(52) U.S. Cl.
CPC .............. *H04Q 9/00* (2013.01); *H04L 67/12* (2013.01)

(58) Field of Classification Search
CPC . B60R 25/1004; G01D 21/00; G01M 99/005; G01N 33/48792; G01R 31/3606; G05B 15/02; G08C 15/00; G08C 15/06; H04J 9/00; H04L 1/188; H04L 67/12; H04L 69/40; H04Q 9/00; H04W 88/02; Y02D 30/70
USPC ........................................... 340/3.44
See application file for complete search history.

(56) References Cited

U.S. PATENT DOCUMENTS

| 2005/0262404 A1 | 11/2005 | Ueno |
| 2007/0171030 A1 | 7/2007 | Kobayashi |
| 2014/0247055 A1 | 9/2014 | Lee |

(Continued)

FOREIGN PATENT DOCUMENTS

| CN | 1842113 A | 10/2006 |
| CN | 201522764 U | 7/2010 |
| CN | 106168519 A | 11/2016 |

(Continued)

OTHER PUBLICATIONS

International Search Report and Written Opinion of PCT Application No. PCT/JP2020/015556, dated Jul. 7, 2020, 08 pages of ISRWO.

*Primary Examiner* — Stephen R Burgdorf
(74) *Attorney, Agent, or Firm* — CHIP LAW GROUP

(57) ABSTRACT

A data processing system includes a sensor apparatus configured to continuously detect data, determine a state of the data that is detected, transmit the data in accordance with a determination result, and continue to detect the data regardless of the determination result, and a receiving apparatus configured to receive the data transmitted from the sensor apparatus.

15 Claims, 12 Drawing Sheets

(56) References Cited

U.S. PATENT DOCUMENTS

2018/0198314 A1\* 7/2018 Aisaka .................... H04Q 9/00
2019/0279498 A1 9/2019 Honda et al.

FOREIGN PATENT DOCUMENTS

| | | | |
|---|---|---|---|
| CN | 110024414 A | | 7/2019 |
| EP | 3565267 A1 | | 11/2019 |
| JP | H02165083 A | | 6/1990 |
| JP | H11206717 A | | 8/1999 |
| JP | 2004-265388 A | | 9/2004 |
| JP | 2008009538 A | \* | 1/2008 |
| JP | 2008250795 A | | 10/2008 |
| JP | 2015-148418 A | | 8/2015 |
| JP | 2017219926 A | \* | 12/2017 |
| JP | 2018-107689 A | | 7/2018 |
| JP | 2018-206018 A | | 12/2018 |
| WO | 2018/123270 A1 | | 7/2018 |
| WO | 2018/221046 A1 | | 12/2018 |

\* cited by examiner

DATA PROCESSING SYSTEM, DATA PROCESSING METHOD, SENSOR APPARATUS, AND RECEIVING APPARATUS

CROSS REFERENCE TO RELATED APPLICATIONS

This application is a U.S. National Phase of International Patent Application No. PCT/JP2020/015556 filed on Apr. 6, 2020, which claims priority benefit of Japanese Patent Application No. JP 2019-085763 filed in the Japan Patent Office on Apr. 26, 2019. Each of the above-referenced applications is hereby incorporated herein by reference in its entirety.

TECHNICAL FIELD

The present technology relates to a data processing system, a data processing method, a program, a sensor apparatus, and a receiving apparatus.

BACKGROUND ART

A data processing system including a sensor apparatus that detects data by sensing and a receiving apparatus such as a server that receives the data from the sensor apparatus for storage, analysis, and the like of the data has been known. In such a data processing system, the sensor apparatus that has transmitted abnormal data to the receiving apparatus is usually deactivated or disconnected from the receiving apparatus on the assumption that abnormality, failure, trouble, or the like has occurred. Furthermore, the sensor apparatus usually remains deactivated or disconnected thereafter regardless of whether a state of the sensor apparatus returns to normal.

In such a data processing system, there has been proposed a technique for, in a case where transmission of abnormality information to an external apparatus is stopped because a main power supply has been turned off during the transmission of the information, automatically resuming the transmission of the abnormality information when the main power supply is turned on (Patent Document 1).

CITATION LIST

Patent Document

Patent Document 1: Japanese Patent Application Laid-Open No. 2004-265388

SUMMARY OF THE INVENTION

Problems to be Solved by the Invention

There has been a problem that unnecessary data is continuously transmitted from the sensor apparatus to the receiving apparatus because no abnormality detection function is provided on the sensor apparatus side and abnormality detection is necessary on the receiving apparatus side. In a case where there are many sensor apparatuses, there has been a problem that thus always continuously transmitting the unnecessary data puts pressure on original normal data communication. In addition, when the sensor apparatus temporarily malfunctions and measures abnormal data, the sensor apparatus is conventionally judged to have failed at a time of transmission of that data to the receiving apparatus and is disabled. It has not been assumed that the sensor apparatus continues detection or resumes the data transmission thereafter.

The technique described in Patent Document 1 is merely for automatically resuming the information transmission to the external apparatus in accordance with ON/OFF of the main power supply, and not for resuming the transmission when a state of a communication apparatus returns to normal.

The present technology has been made in view of such a point, and an object thereof is to provide a data processing system, a data processing method, a program, a sensor apparatus, and a receiving apparatus allowing for continuing data detection in the sensor apparatus and switching between interrupting and resuming data transmission in accordance with a state of the sensor apparatus or a state of a data detection target.

Solutions to Problems

In order to solve the above-described problems, a first technology is a data processing system including a sensor apparatus configured to determine a state of data that is detected, transmit the data in accordance with a determination result, and continue to detect the data regardless of the determination result, and a receiving apparatus configured to receive the data transmitted from the sensor apparatus.

Furthermore, a second technology is a data processing method in a data processing system including a sensor apparatus and a receiving apparatus, the method including, by the sensor apparatus, determining a state of data that is detected, transmitting the data in accordance with a determination result to the receiving apparatus, and continuing to detect the data regardless of the determination result, and by the receiving apparatus, receiving the data transmitted from the sensor apparatus.

Furthermore, a third technology is a program for executing a data processing method in a data processing system including a sensor apparatus and a receiving apparatus, the method including, by the sensor apparatus, determining a state of data that is detected, transmitting the data in accordance with a determination result to the receiving apparatus, and continuing to detect the data regardless of the determination result, and by the receiving apparatus, receiving the data transmitted from the sensor apparatus.

Furthermore, a fourth technology is a sensor apparatus including a sensor unit configured to detect data, a determination unit configured to determine a state of the data that is detected, and a communication unit configured to communicate with a receiving apparatus, the sensor apparatus being configured to transmit the data in accordance with a determination result of the determination unit and continue to detect the data regardless of the determination result.

Furthermore, a fifth technology is a receiving apparatus including a communication unit configured to receive data transmitted from a sensor apparatus, and a determination unit configured to determine a state of the data, the receiving apparatus being configured to transmit an instruction to the sensor apparatus in accordance with a determination result of the determination unit.

MODE FOR CARRYING OUT THE INVENTION

Hereinafter, an embodiment of the present technology will be described with reference to the drawings. Note that the description will be given in the following order.
<1. Embodiment>
[1-1. Configuration of Data Processing System 10]
[1-2. Configuration of Sensor Apparatus 100]
[1-3. Configuration of Receiving Apparatus 200]
[1-4. Data Determination Process]
[1-5. Processing in Sensor Apparatus 100]
[1-6. Processing in Receiving Apparatus 200]
<2. Modification>

1. Embodiment

[1-1. Configuration of Data Processing System 10]

Figure 1:
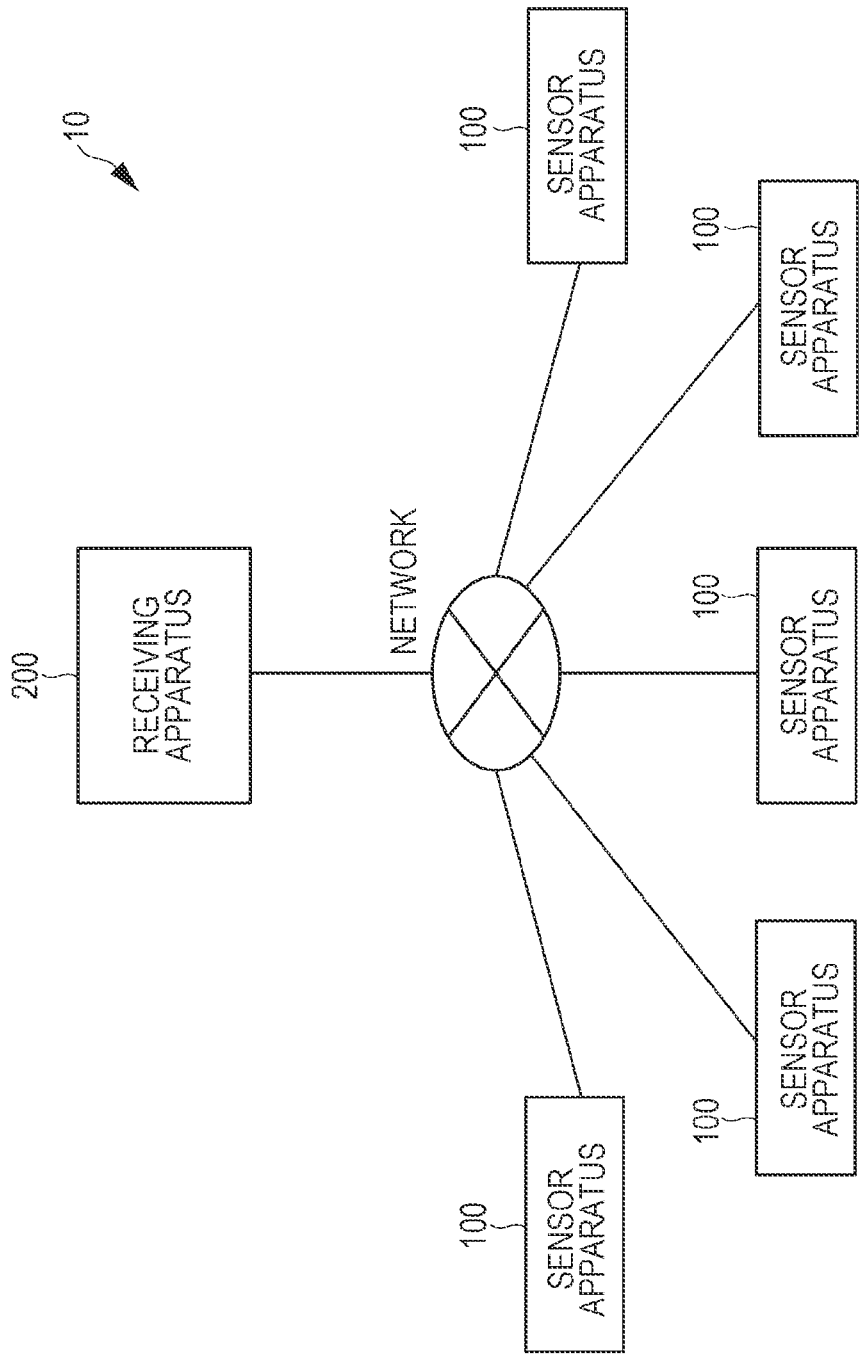
FIG. 1 is a block diagram illustrating a configuration of a data processing system 10.

A configuration of a data processing system 10 will be described with reference to FIG. 1. The data processing system 10 includes a sensor apparatus 100 and a receiving apparatus 200. The sensor apparatus 100 and the receiving apparatus 200 are connected with each other by a network. The network may be wired or wireless. Examples of the wireless network include a wireless local area network (LAN) such as a Wireless Fidelity (Wi-Fi) network, a fourth generation mobile communication system (4G) network, a fifth generation mobile communication system (5G) network, a broadband network, and Bluetooth (registered trademark).

A plurality of sensor apparatuses 100 is connected to the receiving apparatus 200 via the network. Each sensor apparatus 100 continuously transmits data that is detected regularly or irregularly to the receiving apparatus 200. The receiving apparatus 200 stores the received data to use the data for various types of data processing, to share the data with another apparatus, or to provide the data to another apparatus. The number of the sensor apparatuses 100 connected to the receiving apparatus 200 is not limited, and may be one or more.

[1-2. Configuration of Sensor Apparatus 100]

Figure 2:
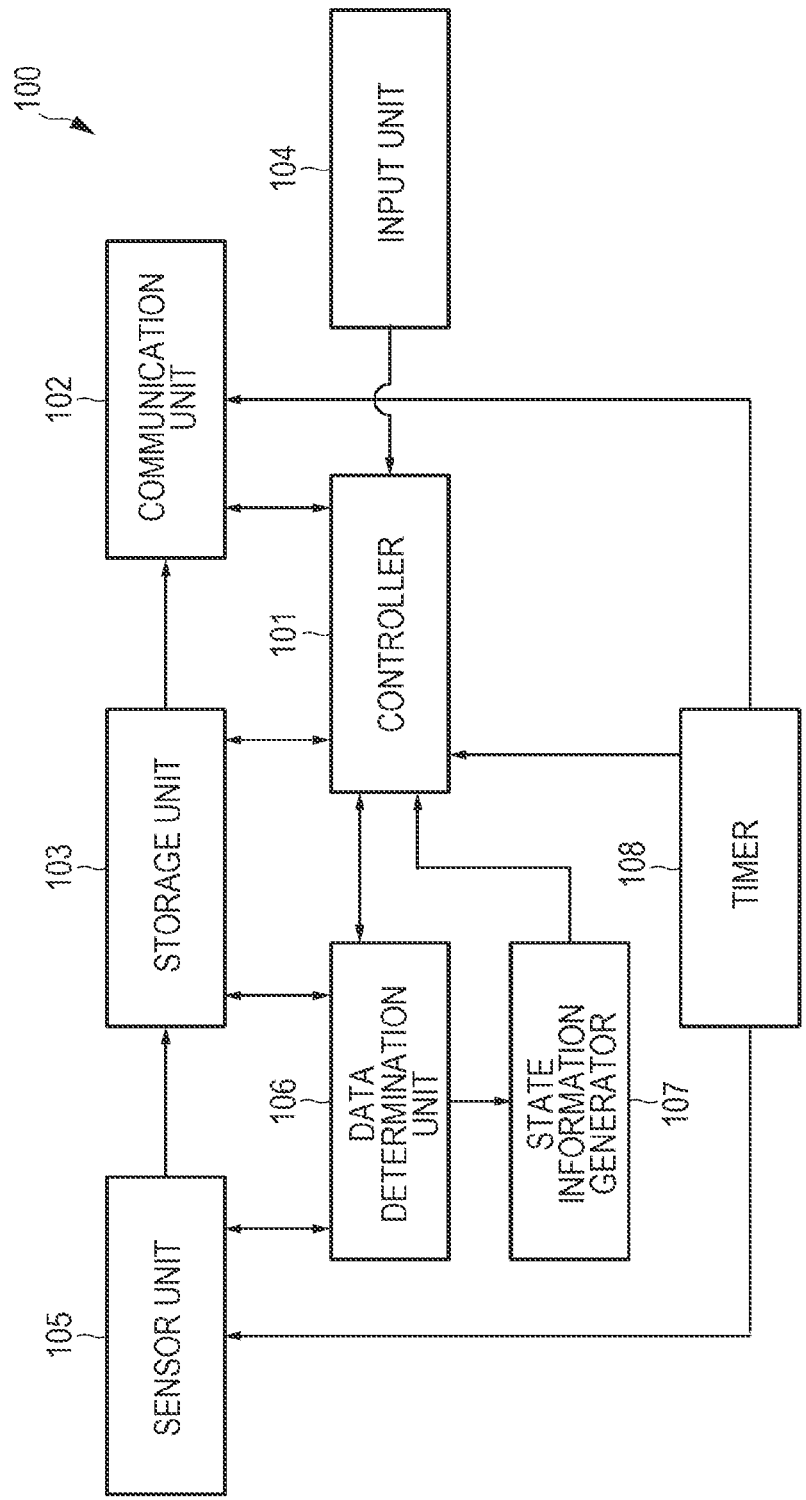
FIG. 2 is a block diagram illustrating a configuration of a sensor apparatus 100.

A configuration of the sensor apparatus 100 will be described with reference to FIG. 2. The sensor apparatus 100 includes at least a controller 101, a communication unit 102, a storage unit 103, an input unit 104, a sensor unit 105, a data determination unit 106, a state information generator 107, and a timer 108.

The controller 101 includes a central processing unit (CPU), a random access memory (RAM), a read only memory (ROM), and the like. The ROM stores a program and the like to be loaded and run by the CPU. The RAM is used as a work memory of the CPU. The CPU controls the entire sensor apparatus 100 by executing various processes according to the program stored in the ROM and issuing commands.

The communication unit 102 is a communication module that communicates with the receiving apparatus 200 via the network in accordance with a predetermined communication standard. Examples of a communication method include a wireless LAN such as Wi-Fi, 4G, 5G, broadband, and Bluetooth (registered trademark) as described above.

The storage unit 103 is a storage medium including, for example, a hard disc drive (HDD), a semiconductor memory, a solid state drive (SSD), or the like, and stores an application, a program, and the like as well as data detected by the sensor unit 105.

The input unit 104 is an input device for a user to input instructions, settings, and the like to the sensor apparatus 100. Examples of the input device include a keyboard, a mouse, a touch panel, and a microphone for sound input.

The sensor unit 105 is a sensor that detects various types of information by sensing. Examples of the sensor include a camera that acquires image data or video data, a microphone that acquires sound data, various biological sensors that detect biological information such as heartbeat data, blood flow data, fingerprint data, voiceprint data, face data, and vein data, and various environmental sensors that detect environmental information such as temperature data, humidity data, rainfall data, illuminance data, and snowfall accumulation data. Not only the above-described sensors but any sensor that can detect data may be used.

The data determination unit 106 determines whether or not the data detected by the sensor unit 105 is normal or abnormal. A definition of the normality and abnormality and a determination method will be described later.

The state information generator 107 generates state information indicating that the data is normal or abnormal in response to a determination result from the data determination unit 106, and adds the state information to the data.

The timer 108 has a clock function for timing. In a case where the sensor unit 105 detects data at a predetermined timing, the timer 108 notifies the sensor unit 105 of the timing. Furthermore, in a case where the communication unit 102 transmits data to the receiving apparatus 200 at a predetermined timing, the timer 108 notifies the communication unit 102 of the timing.

The sensor apparatus 100 may be any one of various sensor devices specialized in a sensor function and apparatuses that have a sensor function and can transmit data detected by sensing to the receiving apparatus 200, such as a smartphone, a personal computer, a tablet terminal, a camera, wearable equipment, a smart speaker, game equipment, a robot, and various types of Internet of things (IoT) equipment.

[1-3. Configuration of Receiving Apparatus 200]

Figure 3:
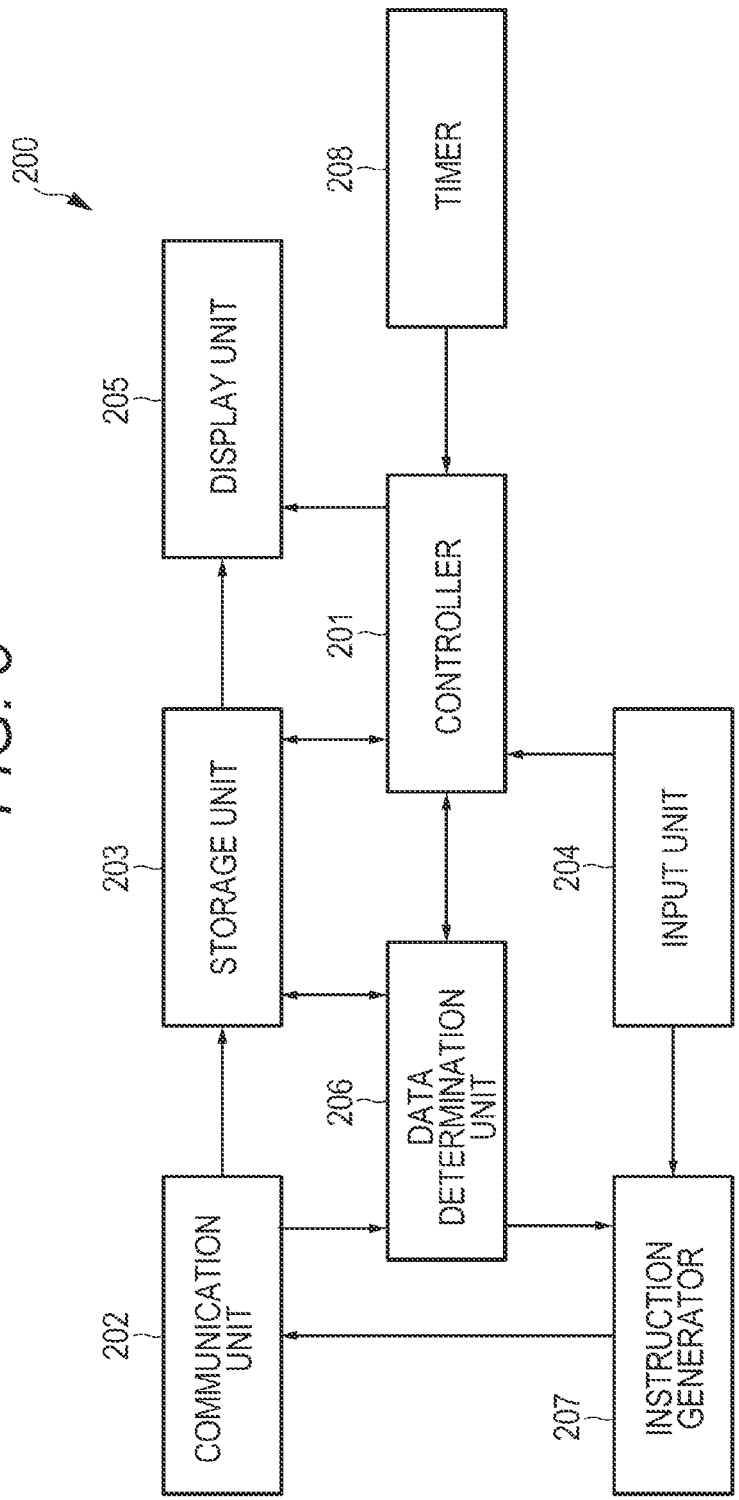
FIG. 3 is a block diagram illustrating a configuration of a receiving apparatus 200.

Next, a configuration of the receiving apparatus 200 will be described with reference to FIG. 3. The receiving apparatus 200 includes at least a controller 201, a communication unit 202, a storage unit 203, an input unit 204, a display unit 205, a data determination unit 206, an instruction generator 207, and a timer 208. The controller 201, the communication unit 202, the storage unit 203, and the input unit 204 are similar to those included in the sensor apparatus 100, and thus the description thereof will be omitted.

The display unit 205 is a display device or the like for displaying data received from the sensor apparatus 100, a user interface for use of the receiving apparatus, and the like. Examples of the display device include a display device constituted by a liquid crystal display (LCD), a plasma display panel (PDP), an organic electro luminescence (EL) panel, or the like. Note that the receiving apparatus 200 may include, as an output device in addition to the display unit 205, a speaker that outputs sound.

The data determination unit 206 determines whether the data transmitted from the sensor apparatus 100 is in a normal or abnormal state. A definition of the normality and abnormality and a determination method will be described later.

The instruction generator 207 generates an instruction that is transmitted from the receiving apparatus 200 to the sensor apparatus 100, or specifically, a data transmission interruption instruction and a data transmission resumption instruction, in response to a determination result from the data determination unit 106, and provides that instruction to the communication unit 202 for transmission to the sensor apparatus 100. In addition, when a predetermined condition is satisfied, the instruction generator 207 generates a redetermination instruction that is transmitted to the sensor apparatus 100, and provides the instruction to the communication unit 202 for transmission to the sensor apparatus 100.

The timer 208 has a clock function for timing. In a case where the instruction is transmitted to the sensor apparatus 100 at a predetermined timing, the timer 208 notifies the communication unit 202 of the timing. Furthermore, in a case where the condition for the instruction generator 207 to generate the redetermination instruction is elapse of a predetermined time interval, the timer 208 measures the elapse of time to provide the timing information to the instruction generator 207.

The receiving apparatus 200 may be any one of apparatuses that can receive data transmitted from the sensor apparatus 100, such as a server apparatus, a smartphone, a personal computer, a tablet terminal, wearable equipment, a smart speaker, game equipment, a robot, and various types of IoT equipment.

Note that the configuration of the sensor apparatus 100 for executing the present technology, such as control of the sensor unit 105, processing in the data determination unit 106, and processing in the state information generator 107, may be implemented by a program being executed. This applies to the receiving apparatus 200. The program may be pre-installed in the sensor apparatus 100 and the receiving apparatus 200, or may be downloaded or distributed through a storage medium or the like to be installed by the user himself/herself.

[1-4. Outline of Processing in Data Processing System 10]

Figure 4:
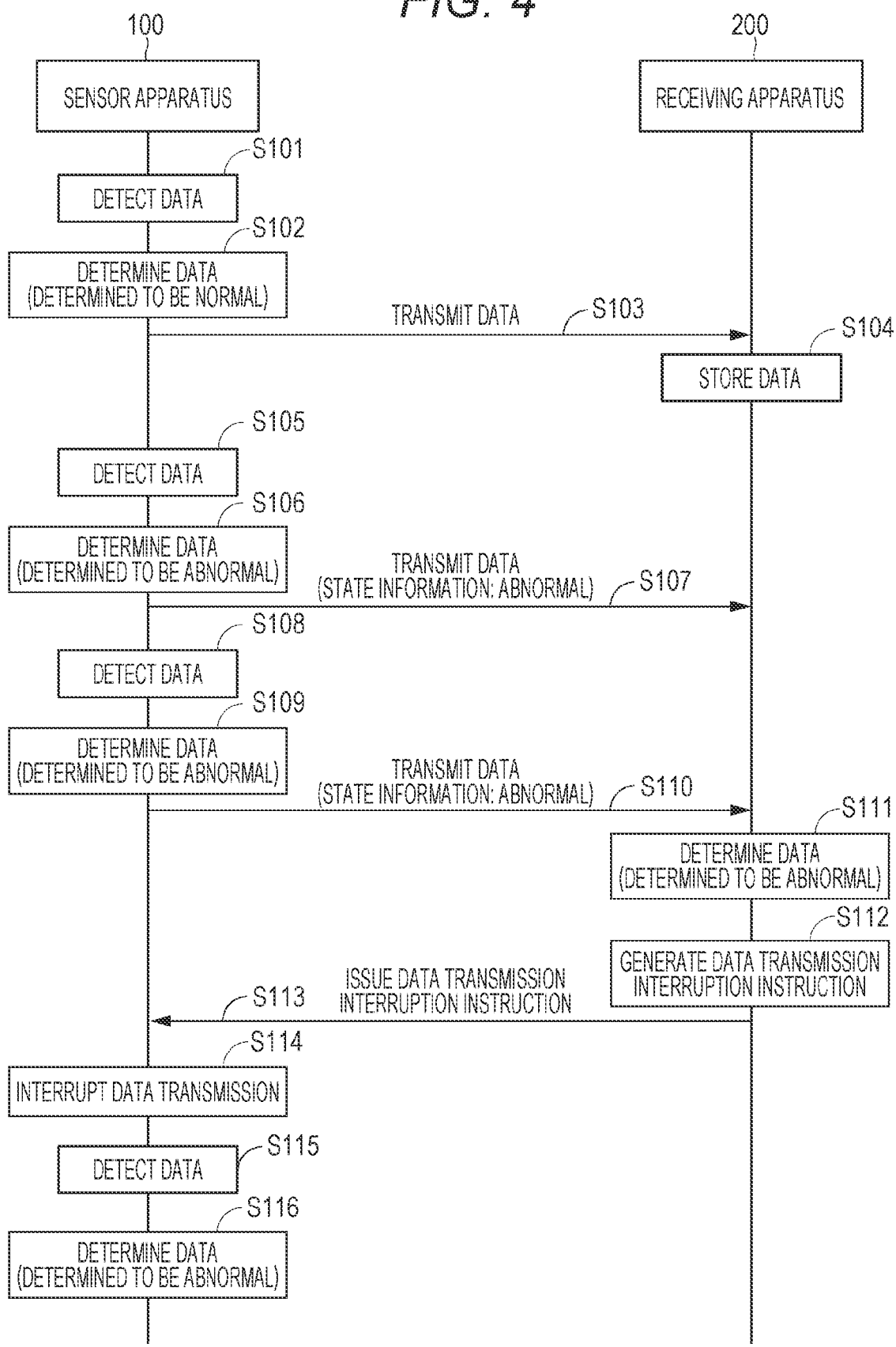
FIG. 4 is a sequence diagram illustrating an outline of processing in the data processing system 10.

Next, processing between the sensor apparatus 100 and the receiving apparatus 200 in the data processing system 10 will be described with reference to a sequence diagram in FIG. 4.

First, when the sensor unit 105 of the sensor apparatus 100 detects data in step S101, the data determination unit 106 of the sensor apparatus 100 determines a state of the data as illustrated in step S102. In the present technology, the state of data is determined to be normal or abnormal by a determination process. The state and the determination method vary among types of data. For example, in a case where the data is an image or video, the state of the data is determined to be normal or abnormal in accordance with how much an intended subject is seen in the image. Furthermore, in a case where the data is a value measured by any type of measuring apparatus, the state of the data is determined to be normal or abnormal in accordance with whether the value is a predetermined threshold or greater or less, whether the value is within/outside a predetermined range, or the like. Note that, in data normality or abnormality determination, a range of the value or the like for determining the data to be normal or abnormal may be provided, and then whether the data is within the normal range or the abnormal range may be determined. Details of the data state determination method will be described later. If the data is normal, the sensor apparatus 100 transmits the data to the receiving apparatus 200 as illustrated in step S103. Then, when receiving the data, the receiving apparatus 200 stores the data in the storage unit 203 as illustrated in step S104. As long as the data detected by the sensor apparatus 100 is normal, these steps S101 to S104 are repeatedly performed, and the data detected by the sensor apparatus 100 is transmitted to the receiving apparatus 200 to be stored. Note that the determination process may be executed at a cycle longer than an ordinary data detection cycle or may be detected at a cycle shorter than the data detection cycle. The cycle can be appropriately set according to characteristics of the sensor unit 105 or identification of the data.

Meanwhile, when determining that the data detected by the sensor apparatus 100 is abnormal as illustrated in steps S105 and S106, the sensor apparatus 100 transmits to the receiving apparatus 200 the data to which state information indicating that the data is abnormal is added as illustrated in step S107. The data to which the state information is added is not stored in the storage unit 203 in the receiving apparatus 200.

Then, if a count of continuously transmitting the data to which the state information indicating that the data is abnormal is added from the sensor apparatus 100 to the receiving apparatus 200 reaches a predetermined number as illustrated in steps S108 to S110, the data determination unit 206 of the receiving apparatus 200 performs the data determination process as illustrated in step S111.

When determining that the data is abnormal as illustrated in step S111, the receiving apparatus 200 generates the data transmission interruption instruction as illustrated in step S112, and transmits the data transmission interruption instruction to the sensor apparatus 100 in step S113.

The sensor apparatus 100 that has received the data transmission interruption instruction interrupts the data transmission to the receiving apparatus 200 as illustrated in step S114. Thereafter, the data transmission is interrupted until the data transmission resumption instruction is transmitted from the receiving apparatus 200 to the sensor apparatus 100. Thus, the sensor apparatus 100 that has interrupted the data transmission does not transmit the data to the receiving apparatus 200 but continues the data detection and the data abnormality determination thereafter as illustrated in steps S115 and S116.

Next, the description will be given with reference to a sequence diagram in FIG. 5. When, in a situation where the sensor apparatus 100 interrupts the data transmission, determining that the data is normal as illustrated in step S202 in FIG. 5, the sensor apparatus 100 transmits to the receiving apparatus 200 the data to which state information indicating that the data is normal is added as illustrated in step S203.

Then, if a count of transmitting the data to which the state information indicating that the data is normal is added from the sensor apparatus 100 to the receiving apparatus 200 reaches a predetermined number as illustrated in steps S204 to S206, the receiving apparatus 200 performs the data determination process as illustrated in step S207. This is because, in a case where the sensor apparatus 100 transmits the data determined to be normal the predetermined number of times, there is a possibility that a malfunction or an environment that causes the data abnormality has improved and the data has returned to normal.

Then, when determining that the data is normal, the receiving apparatus 200 generates the data transmission resumption instruction as illustrated in step S208, and transmits the data transmission resumption instruction to the sensor apparatus 100 in step S209. This is because, in a case where the sensor apparatus 100 transmits the data determined to be normal the predetermined number of times and further the receiving apparatus 200 determines that the data is normal, it is possible to judge that the malfunction or the environment that causes the data abnormality has improved and the data has returned to normal.

The sensor apparatus 100 that has received the data transmission resumption instruction resumes the data transmission, and transmits the detected normal data as it is to the receiving apparatus 200 as illustrated in steps S210 to S212. Then, the receiving apparatus 200 stores the received data in the storage unit 203 as illustrated in step S213.

Thereafter, as long as the data is determined to be normal, the sensor apparatus 100 transmits the detected data to the receiving apparatus 200, and the receiving apparatus 200 stores the data in the storage unit 203 as illustrated in steps S214 to S217.

Figure 6:
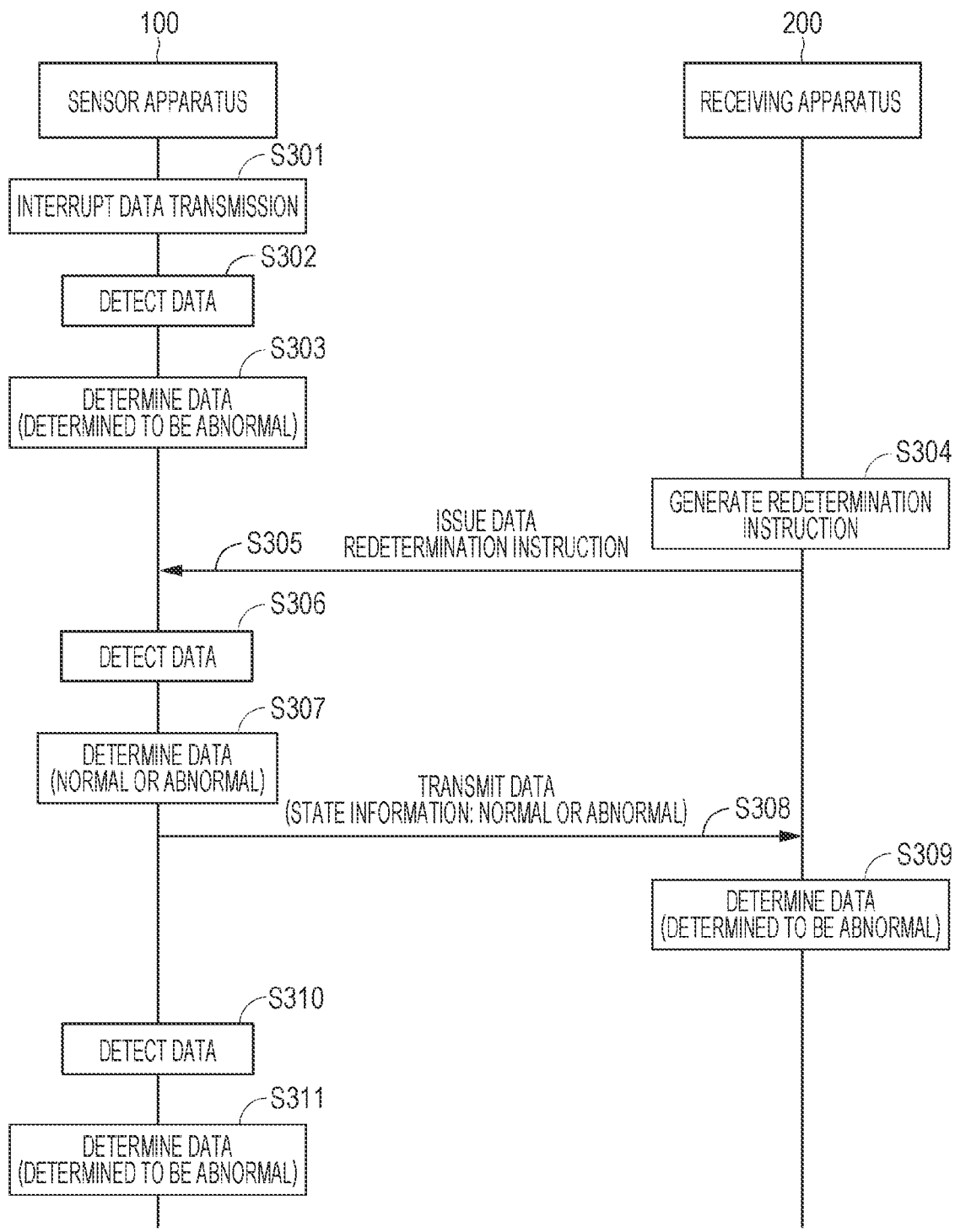
FIG. 6 is a sequence diagram illustrating the outline of the processing in the data processing system 10.

Next, the description will be given with reference to a sequence diagram in FIG. 6. When, in the situation where the sensor apparatus 100 interrupts the data transmission as illustrated in step S301 in FIG. 6 (in this case, the sensor apparatus 100 still continues the data detection and the data abnormality determination as illustrated in steps S302 and S303), a predetermined condition is satisfied, the receiving apparatus 200 generates a data redetermination instruction as illustrated in step S304, and transmits the data redetermination instruction to the sensor apparatus 100 in step S305. The data redetermination instruction prescribes a process performed by the receiving apparatus 200 for redetermining the data on the assumption that the data may have returned to a normal state if the predetermined condition is satisfied after the data becomes an abnormal state.

The case where the predetermined condition is satisfied is, for example, a case where a predetermined time interval or a predetermined number of days have elapsed since the transmission of the data transmission interruption instruction from the receiving apparatus 200 to the sensor apparatus 100. This is because the malfunction or the environment of the sensor apparatus 100 that causes the data to be in the abnormal state may have been improved by the elapse of the time interval or days. Furthermore, the case where the condition is satisfied may be a case where, with reference to environmental information such as weather, the weather becomes a predetermined state. For example, in a case where the sensor apparatus 100 is installed outdoors and the data becomes abnormal due to dirt, the data may return to normal after rain owing to the rain washing the dirt away. Thus, the condition is set to "rain stopping" or the like.

The sensor apparatus 100 that has received the data redetermination instruction detects the data as illustrated in step S306, and then performs the data determination process in step S307. Regardless of whether the state of the data is normal or abnormal as a result of the data determination process, the sensor apparatus 100 transmits to the receiving apparatus 200 the data to which the state information indicating the state of the data is added as illustrated in step S308.

Then, when receiving the data, the receiving apparatus 200 performs the data determination process as illustrated in step S309. When determining that the data is abnormal, the receiving apparatus 200 does not transmit the data transmission resumption instruction to the sensor apparatus 100. Thus, the sensor apparatus 100 still continues only the data detection and the data abnormality determination as illustrated in steps S310 and S311, and does not transmit the data to the receiving apparatus 200.

Figure 7:
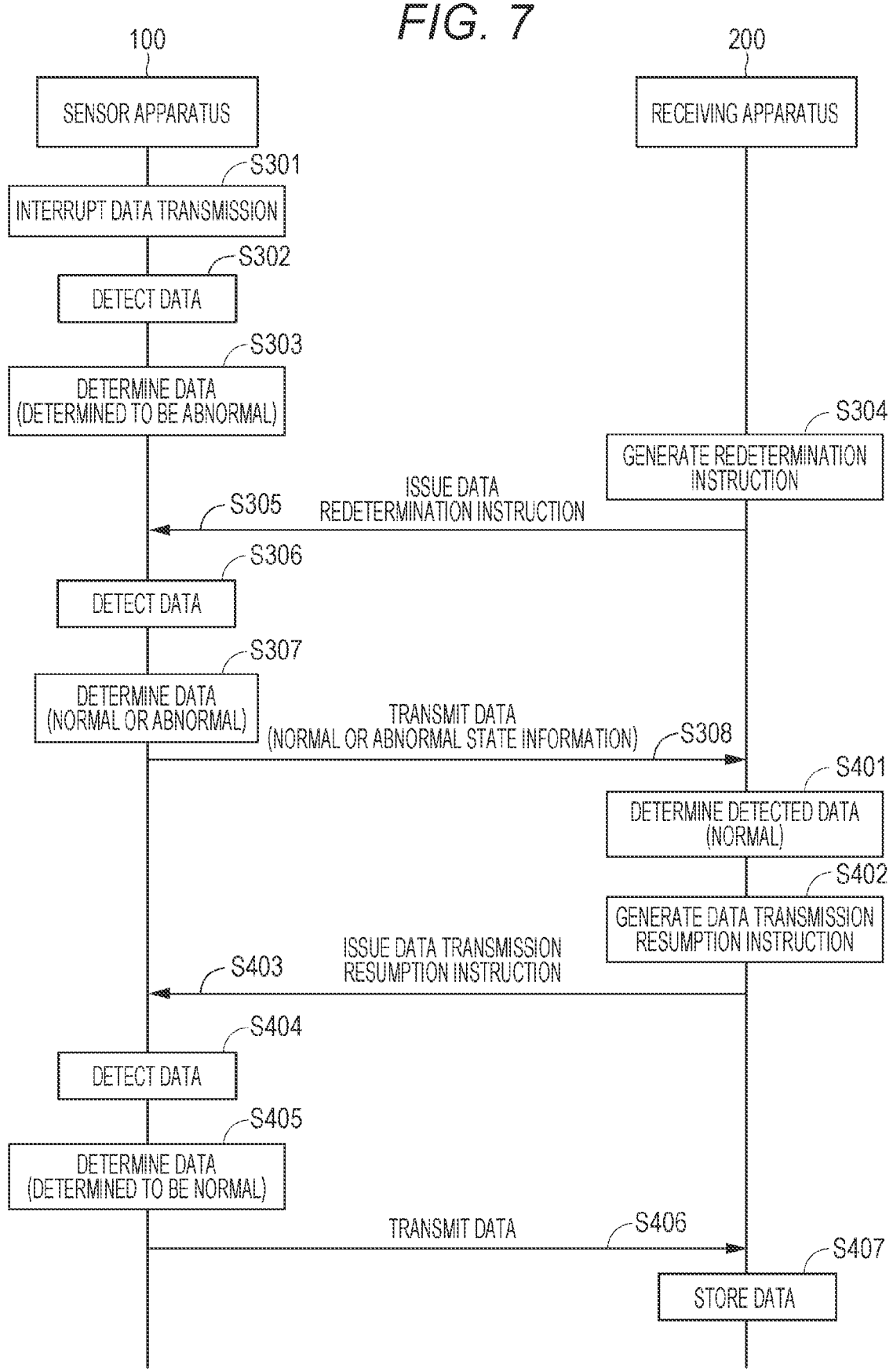
FIG. 7 is a sequence diagram illustrating the outline of the processing in the data processing system 10.

Next, the description will be given with reference to a sequence diagram in FIG. 7. Steps S301 to S308 in FIG. 7 are similar to those in FIG. 6.

In a case where the sensor apparatus 100 that has received the data redetermination instruction from the receiving apparatus 200 detects the data and transmits the data to the receiving apparatus 200, when determining that the data is normal as illustrated in step S401, the receiving apparatus 200 generates the data transmission resumption instruction as illustrated in step S402, and transmits the data transmission resumption instruction to the sensor apparatus 100 in step S403.

In response to the data transmission resumption instruction, the sensor apparatus 100 resumes the data detection as illustrated in step S404, determines the detected data as illustrated in step S405, and transmits the data to the receiving apparatus 200 in step S406. Note that, in this case, the state information indicating that the data is normal is not required to be added to the data, but may be added thereto.

Then, the receiving apparatus 200 stores the received data in the storage unit 203 as illustrated in step S407.

The outline of the processing in the data processing system 10 is as described above.

[1-4. Data Determination Process]

Next, the data determination process for determining the state of data will be described. As described in the outline above, the data determination process is performed in both the sensor apparatus 100 and the receiving apparatus 200. The data determination process can be performed by various methods corresponding to the types of data.

In the determination process, benchmark data for determination is prepared in advance, and determination target data is compared with that benchmark data. When a difference is equal to or less than a predetermined amount, the data is determined to be normal, and when the difference is equal to or greater than the predetermined amount, the data is determined to be abnormal. Furthermore, in a case where the data is represented by a numerical value, an upper limit value of the numerical value is set in advance as the benchmark for determination, and the determination target data is compared with that upper limit value. When the data is equal to or less than the upper limit value, the data is determined to be normal, and when the data is equal to or greater than the upper limit value, the data is determined to be abnormal. Alternatively, in a case where the data is represented by a numerical value, a lower limit value of the numerical value is set in advance as the benchmark for determination, and the determination target data is compared with that lower limit value. When the data is equal to or greater than the lower limit value, the data is determined to be normal, and when the data is equal to or less than the lower limit value, the data is determined to be abnormal. Moreover, a range within which the data is normal may be set, and when the numerical value of the data is within the range, the data is determined to be normal, and when the numerical value is outside the range, the data is determined to be abnormal. It is necessary to set in advance how to perform the data determination process corresponding to the types of data in the sensor apparatus 100 and the receiving apparatus 200.

Note that the benchmark data may be data prepared in advance at a start of using the data processing system 10, or may be data detected by the sensor apparatus 100 after the start of using the data processing system 10 and before detection of the determination target data (that is, past data).

Figure 8C:
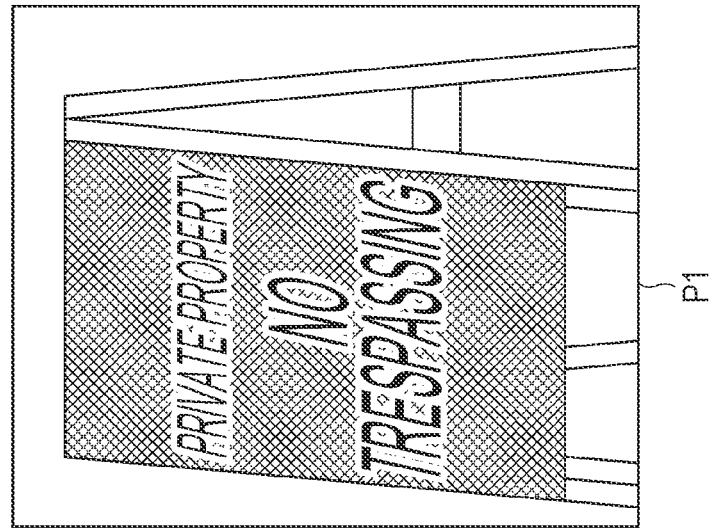
FIGS. 8A, 8B, and 8C are diagrams illustrating a first specific example of a data determination process.
Figure 8B:
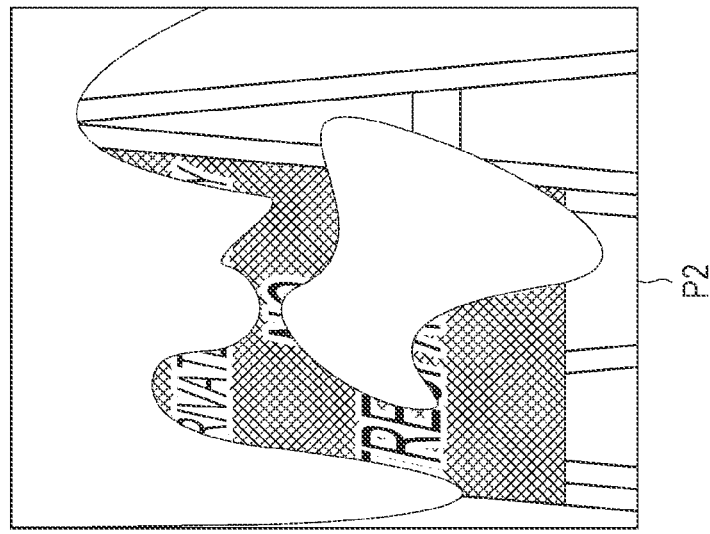
Figure 8A:
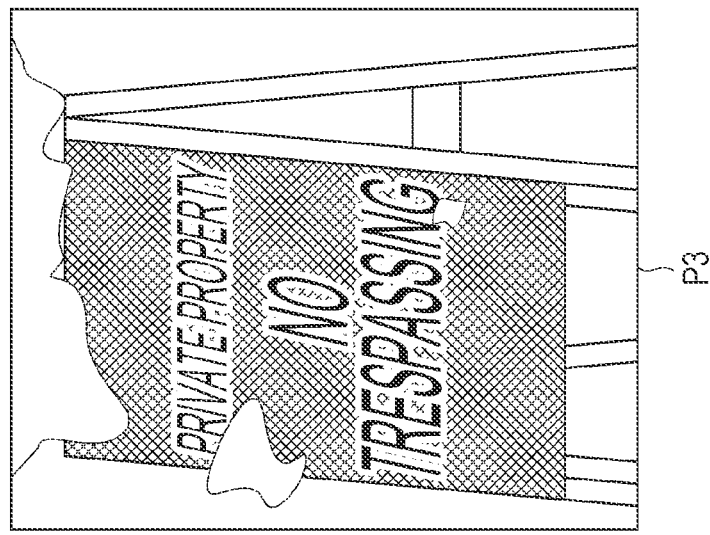

FIGS. 8A, 8B, and 8C are first specific example of the data determination process. It is assumed that the sensor unit 105 is a camera, the data is an image P of a signboard captured by the camera, and the present technology is used for monitoring the state of the signboard.

FIG. 8A illustrates a past captured image P1 as the benchmark data, and FIGS. 8B and 8C illustrate a captured image P2 and a captured image P3 as the determination target data. In a case where the data is captured images as described above, the determination process can be performed by similarity determination in which the captured images P2 and P3 as the determination target data are compared with the past captured image P1 as the benchmark data. There can be used, for the comparison of captured images, an image similarity determination method based on color, an image similarity determination method based on luminance, a similarity determination method based on feature points extracted from images, and the like.

Furthermore, the comparison of captured images can be performed by a method using machine learning. As a learning method, for example, a neural network and deep learning is used. The neural network is a model imitating a human brain neural circuit, and includes three types of layers, namely, an input layer, an intermediate layer (a hidden layer), and an output layer. Furthermore, the deep learning is a model using a neural network having a multilayer structure, and can learn a complex pattern hidden in bulk data by repeatedly learning features in the layers. The deep learning is used, for example, for purpose of identifying an object in an image or a word in sound.

Moreover, as a hardware structure that realizes such machine learning, a neurochip/neuromorphic chip incorporating a concept of a neural network can be used.

In addition, machine learning includes supervised learning, unsupervised learning, semi-supervised learning, reinforcement learning, inverse reinforcement learning, active learning, transfer learning, and the like in terms of problem setting. For example, in the supervised learning, a feature quantity is learned on the basis of given labeled learning data (supervised data). This learning allows for deriving a label of unknown data.

Meanwhile, in the unsupervised learning, a feature quantity is extracted by analyzing unlabeled learning data in bulk, and clustering is performed on the basis of the extracted feature quantity. This learning allows for performing tendency analysis and future prediction on the basis of a huge amount of unknown data.

Furthermore, semi-supervised learning falls between the supervised learning and the unsupervised learning. In a method of the semi-supervised learning, a feature quantity is learned by the supervised learning, and then the feature quantity is automatically calculated and repetitive learning is performed by the unsupervised learning with a huge amount of given training data.

Meanwhile, the reinforcement learning deals with a problem that an agent in a certain environment observes a current state to decide an action to be taken. The agent gains a reward from the environment by selecting an action, and learns a strategy for maximizing the reward gained through a series of actions. In this way, learning an optimal solution in a certain environment leads to reproducing human judgment and allows a computer to master judgment exceeding the human judgment.

The comparison process for captured images based on the benchmark data can be performed by the machine learning as described above.

In the captured image P1 of FIG. 8A as the benchmark data, the entire signboard is seen with no dirt adhering to a lens of the camera. In the captured image P2 of FIG. 8B, the signboard is hidden by dirt adhering to the lens of the camera. In this example, the data is determined to be abnormal because a variation (difference) is equal to or greater than a predetermined amount as compared with the captured image P1 of FIG. 8A. Meanwhile, in FIG. 8C, dirt adheres to the lens of the camera but is of such a small size that the signboard is seen. In this example, the data is determined to be normal because the variation (difference) is equal to or less than the predetermined amount as compared with the captured image P1 of FIG. 8A. Alternatively, the predetermined amount representing the variation (difference) between images may have an upper limit and a lower limit, and the data may be determined to be within a normal range or an abnormal range in accordance with whether or not the data is between the upper limit and the lower limit.

In a case where the data is captured images as described above, whether the data is normal or abnormal depends not only on a state of the lens of the camera but sometimes also on a change in a state of an imaging target. For example, in the example of the signboard in FIGS. 8A, 8B, and 8C, there is a case where dirt adheres to the signboard itself and letters on the signboard are hardly seen or the like.

Figure 9C:
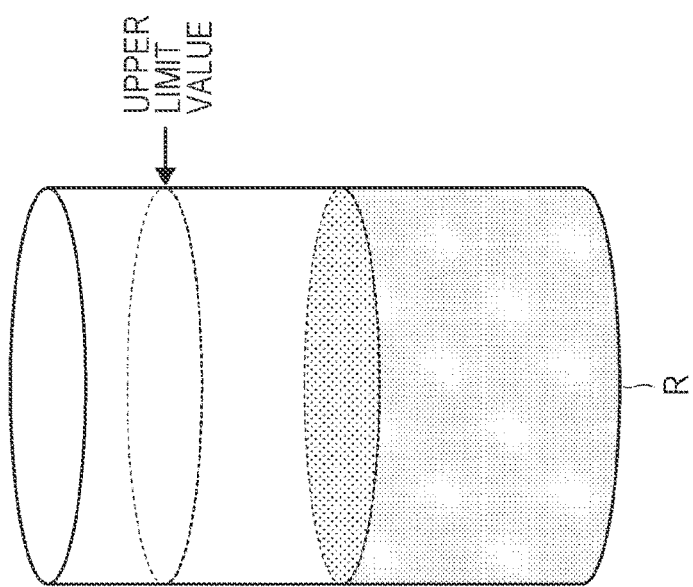
FIGS. 9A, 9B, and 9C are diagrams illustrating a second specific example of the data determination process.
Figure 9B:
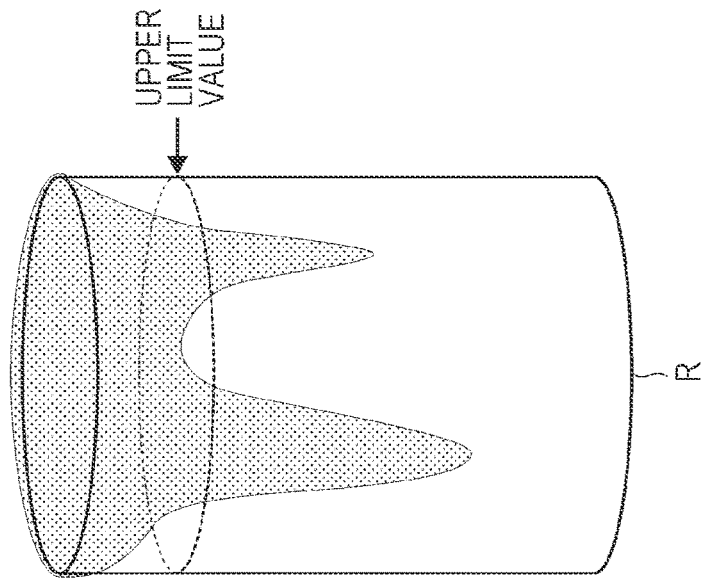
Figure 9A:
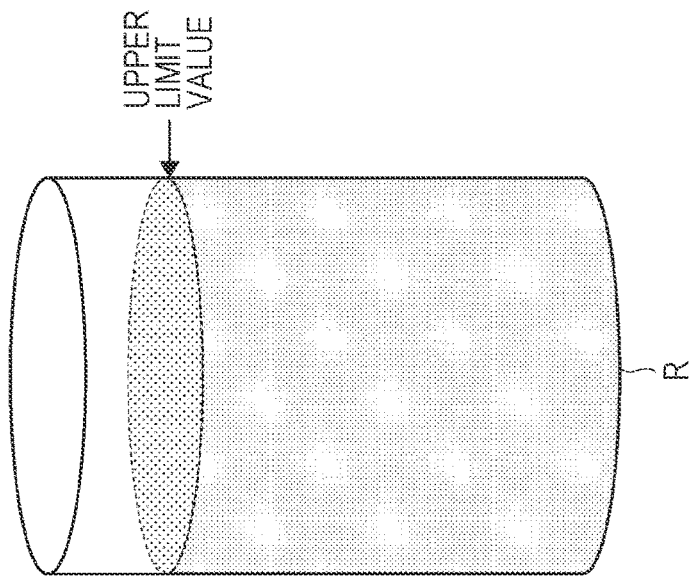

FIGS. 9A, 9B, and 9C are second specific example of the data determination process. It is assumed that the sensor unit 105 is a rainfall sensor R, the data is rainfall measured by the rainfall sensor R, and the present technology is used for monitoring whether the rainfall sensor R functions without any problem.

FIG. 9A illustrates a rainfall upper limit value as the benchmark data, and FIGS. 9B and 9C illustrate examples of the rainfall as the determination target data. In a case where the data is specific numerical values acquired by the sensor apparatus 100 as described above, the rainfall numerical values as the determination target data are compared with the upper limit value in the determination process. When the rainfall data is equal to or less than the upper limit value, the data is determined to be normal, and when the rainfall data is equal to or greater than the upper limit value, the data is determined to be abnormal. Note that, an upper limit value and a lower limit value may be set, and the data may be determined to be within a normal range or an abnormal range in accordance with whether or not the data is between the upper limit value and the lower limit value.

FIG. 9B illustrates an example in which the data is determined to be abnormal because a container constituting the rainfall sensor R is submerged and the rainfall data is equal to or greater than the upper limit value. Meanwhile, FIG. 9C illustrates an example in which the data is determined to be normal because the rainfall in the container constituting the rainfall sensor R is equal to or less than the upper limit value.

Note that, in a case where the rainfall sensor R is used, the data is always zero when there is no water. Thus, it is also possible not to transmit the data to the receiving apparatus 200 in that state. This configuration can reduce useless communication.

Figure 10A:
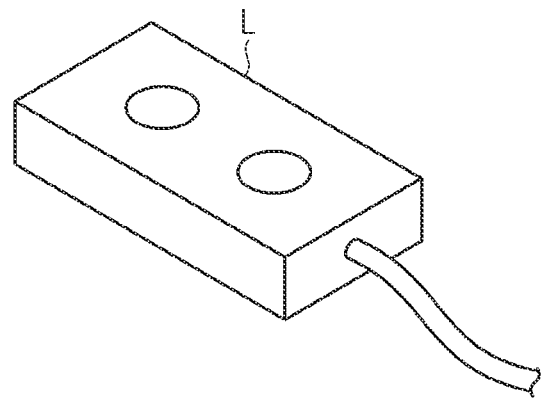
FIGS. 10A 10B, and 10C are diagrams illustrating a third specific example of the data determination process.
Figure 10B:
Figure 10C:
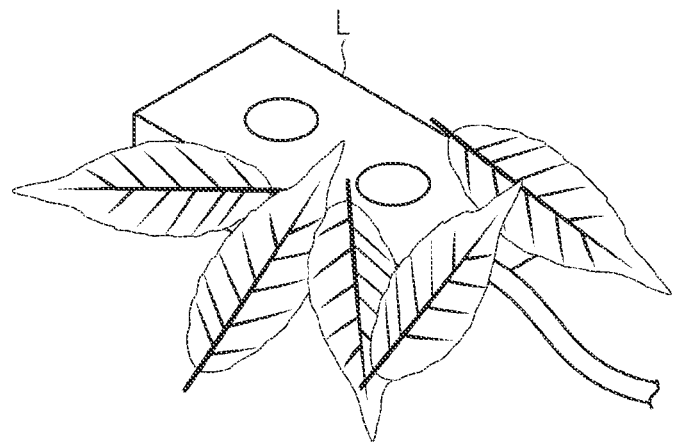

FIGS. 10A, 10B, and 10C is a third specific example of the data determination process. It is assumed that the sensor unit 105 is a sunshine sensor L, the data is illuminance measured by the sunshine sensor L, and the present technology is used for monitoring whether the sunshine sensor L functions without any problem.

FIG. 10A illustrates a state where the sunshine sensor L is covered with nothing and can detect normal illuminance. An illuminance value detected at a predetermined time in this state is used as the benchmark data for determination. FIGS. 10B and 10C illustrate states of the sunshine sensor L when the illuminance as the determination target data is detected.

In the state of FIG. 10B, the entire sunshine sensor L is covered with fallen leaves. In this example, this state causes the illuminance detected at the same time of day as the benchmark data detection to drop below the benchmark value and the data is determined to be abnormal.

In FIG. 10C, the sunshine sensor L has fallen leaves thereon but they are few. In this example, the data is determined to be normal because the illuminance detected at the same time of day as the benchmark data detection is equal to or greater than the benchmark value.

Note that, in a case where the sunshine sensor L is used, it is also possible not to transmit the data to the receiving apparatus 200 in a time zone when the illuminance is undetectable, such as nighttime. This configuration can reduce useless communication.

In a case where the data is specific numerical values acquired by the sensor as described above, the determination process can be performed by comparing the illuminance numerical values as the data with the illuminance numerical value as the benchmark and determining the data to be abnormal if the data reaches the benchmark illuminance. Note that, the benchmark illuminance may have an upper limit value and a lower limit value, and the data may be determined to be within a normal range or an abnormal range in accordance with whether or not the data is between the upper limit value and the lower limit value.

Note that the determination process in the present technology is not limited to the above-described specific examples. The sensor apparatus 100 may be any apparatus that can transmit the data detected by sensing to the receiving apparatus 200, and the determination process can employ various methods corresponding to the types of the data detected by the sensor apparatus 100.

[1-5. Processing in Sensor Apparatus 100]

Figure 11:
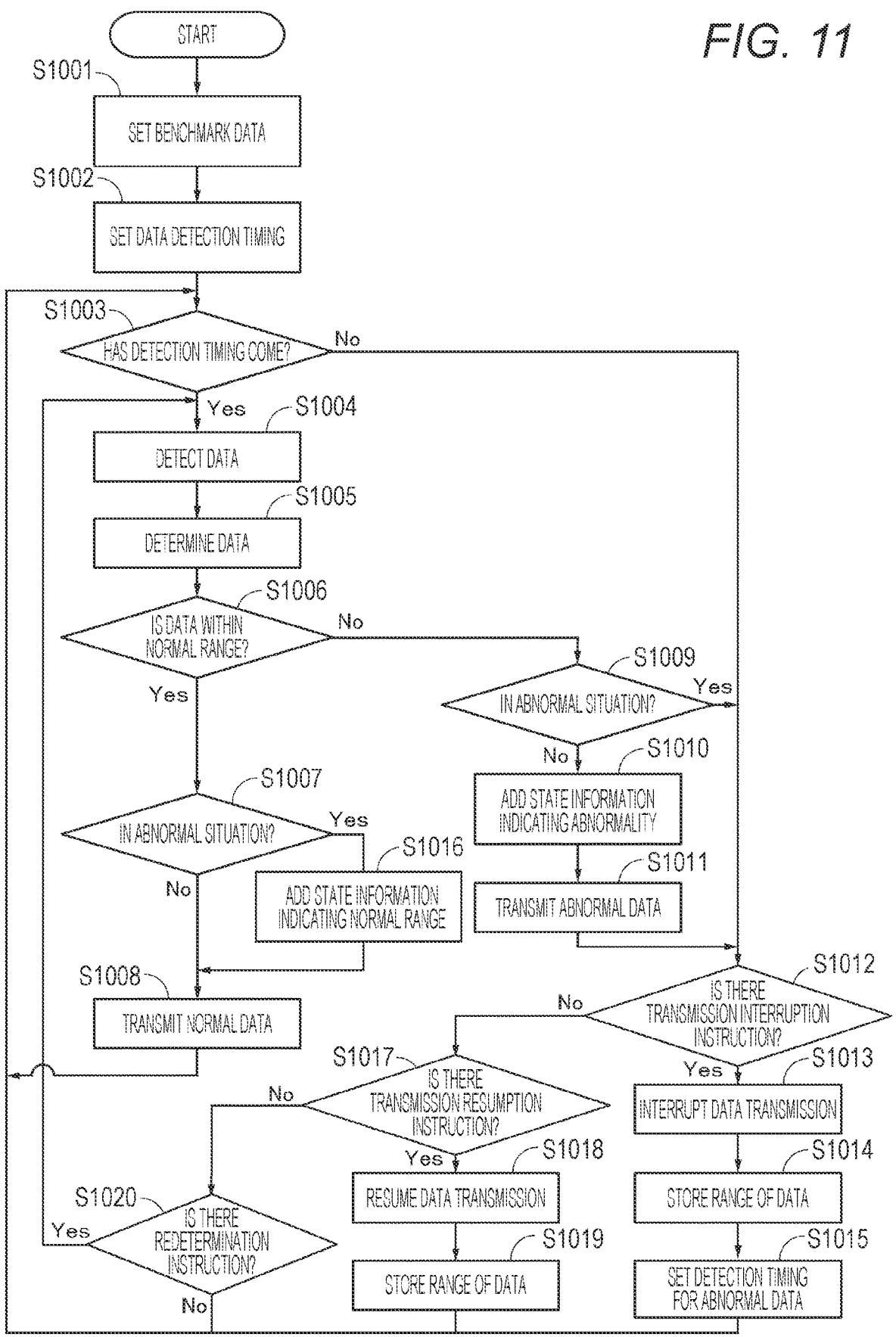

Next, processing in the sensor apparatus 100 will be described with reference to a flowchart of FIG. 11. First, in step S1001, benchmark data for data determination is decided and set in the data determination unit 106. Note that the benchmark data may be set by the user of the data processing system 10 inputting it, by default, or by the sensor apparatus 100 selecting past data.

In addition, in step S1002, a data detection timing at which data is continuously detected is decided and set in the sensor unit 105. The data detection timing may be represented by, for example, an interval in minutes, an interval in hours, or a specific time and date. Note that the order of step S1001 and step S1002 may be reversed. The detection timing may be set in advance by default.

Next, if the data detection timing has come in step S1003 (YES in step S1003), the processing proceeds to step S1004, and the sensor unit 105 detects data. Whether or not the data detection timing has come can be checked by timing with the timer 108. Next, in step S1005, the data determination unit 106 determines the state of the detected data.

If the data is within a normal range (YES in step S1006), the processing proceeds from step S1006 to step S1007, and the sensor apparatus 100 checks whether or not the sensor apparatus 100 is currently in a situation where determination of abnormality has been received from the receiving apparatus 200.

If the sensor apparatus 100 is not in the abnormal situation (NO in step S1007), the processing proceeds to step S1008, and the sensor apparatus 100 transmits the normal data to the receiving apparatus 200.

The description returns to step S1006. If it is determined that the data is not within the normal range in step S1006 (NO in step S1006), the processing proceeds from S1006 to step S1009. In a case where the data is not within the normal range, if the sensor apparatus 100 is in the situation where the determination that the data is abnormal has been received from the receiving apparatus 200, the processing proceeds to S1012. However, if that determination has not been received (NO in step S1009), state information indicating that the data is abnormal is added to the data in step S1010. Then, in step S1011, the sensor apparatus 100 transmits the abnormal data to the receiving apparatus 200.

Next, in step S1012, the sensor apparatus 100 checks whether or not the data transmission interruption instruction is received from the receiving apparatus 200. This is because, as described above, in a case where the receiving apparatus 200 receives the data to which the state information indicating that the data is abnormal is added, the receiving apparatus 200 transmits the data transmission interruption instruction to the sensor apparatus 100.

If the transmission interruption instruction is received from the receiving apparatus 200 (Yes in step S1012), the processing proceeds to step S1013, and the sensor apparatus 100 interrupts the data transmission. Next, the sensor apparatus 100 stores a range of the abnormal data (a value, a state, or the like of the data determined to be abnormal) in step S1014, and as necessary, changes the existing timing for detecting the normal data to set a timing for determining whether or not the abnormal data is continuously detected in step S1015.

The description returns to step S1006. If the data is determined to be normal in step S1006 and the sensor apparatus 100 is currently in a situation where the data transmission is interrupted in step S1007 (YES in step S1007), the processing proceeds to step S1016.

Figure 5:
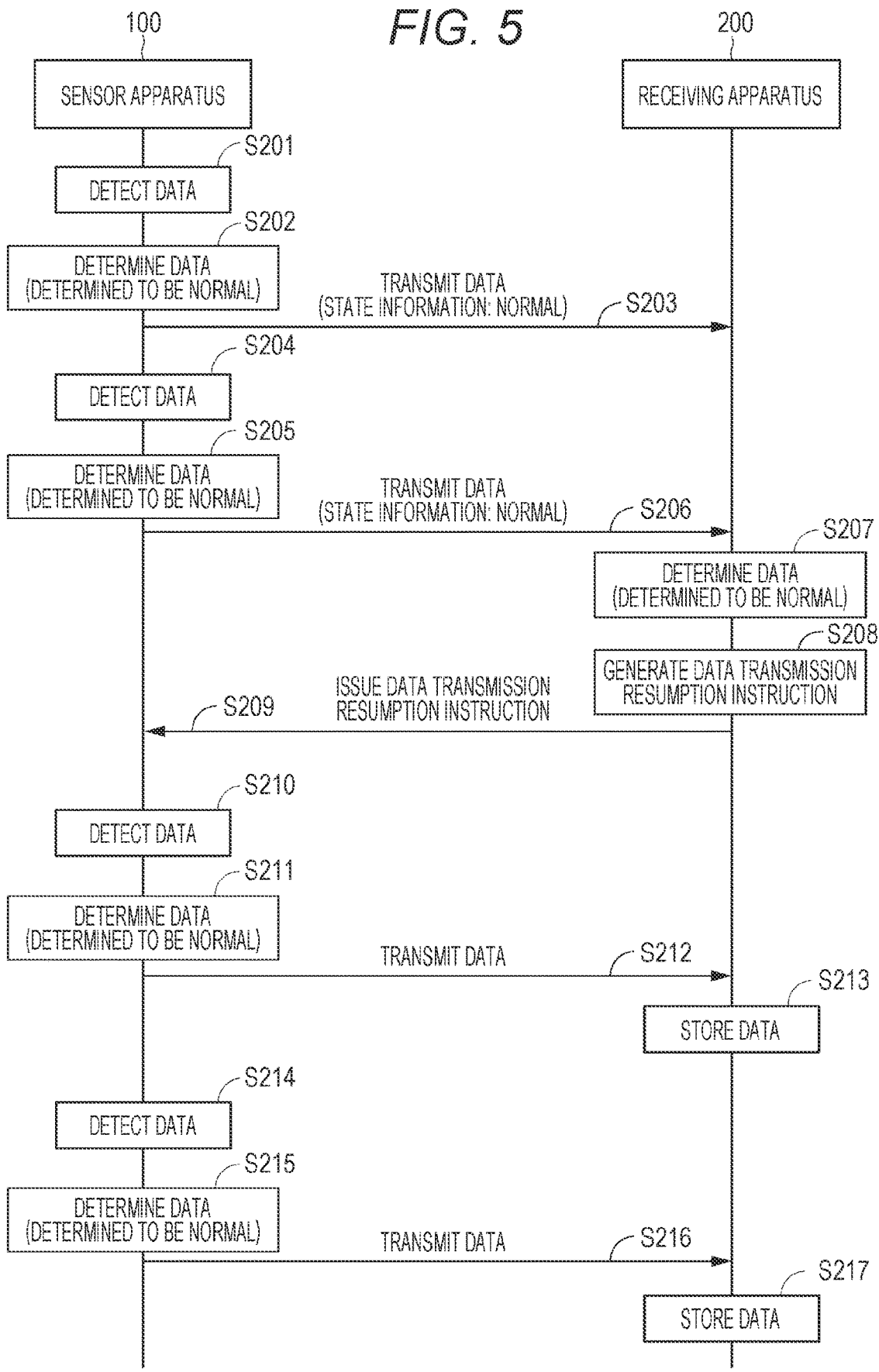
FIG. 5 is a sequence diagram illustrating the outline of the processing in the data processing system 10.

The case where the data is normal in the situation where the data transmission is interrupted corresponds to the above-described case in step S205 in FIG. 5. In this case, state information indicating that the data is within the normal range is added to the data in step S1016, and the data within the normal range is transmitted to the receiving apparatus 200 in step S1008.

The description returns to step S1012. If the sensor apparatus 100 receives no transmission interruption instruction from the receiving apparatus 200 (NO in step S1012), the processing proceeds from step S1012 to step S1017.

Next, in step S1017, the sensor apparatus 100 checks whether or not the data transmission resumption instruction is received from the receiving apparatus 200. The case where the sensor apparatus 100 transmits to the receiving apparatus 200 the data to which the state information indicating that the data is abnormal is added and receives the data transmission resumption instruction from the receiving apparatus 200 corresponds to a case where the sensor apparatus 100 transmits the data that is determined to be abnormal but the receiving apparatus 200 determines the data to be normal.

If the sensor apparatus 100 receives the data transmission resumption instruction from the receiving apparatus 200

(YES in step S1017), the processing proceeds to step S1018, and the sensor apparatus 100 resumes the data transmission and stores a range of the normal data (a value, a state, or the like of the data determined to be abnormal) in step S1019.

The description returns to step S1017. If the sensor apparatus 100 receives no data transmission resumption instruction from the receiving apparatus 200 (NO in step S1017), the processing proceeds to step S1020. Next, in step S1020, the sensor apparatus 100 checks whether or not the redetermination instruction is received from the receiving apparatus 200. If the redetermination instruction is received from the receiving apparatus 200, the processing proceeds to step S1003, and the detected data is determined and transmitted to the receiving apparatus 200 by the processing of steps S1014 to S1011.

The processing in the sensor apparatus 100 is performed as described above.

[1-6. Processing in Receiving Apparatus 200]

Figure 12:
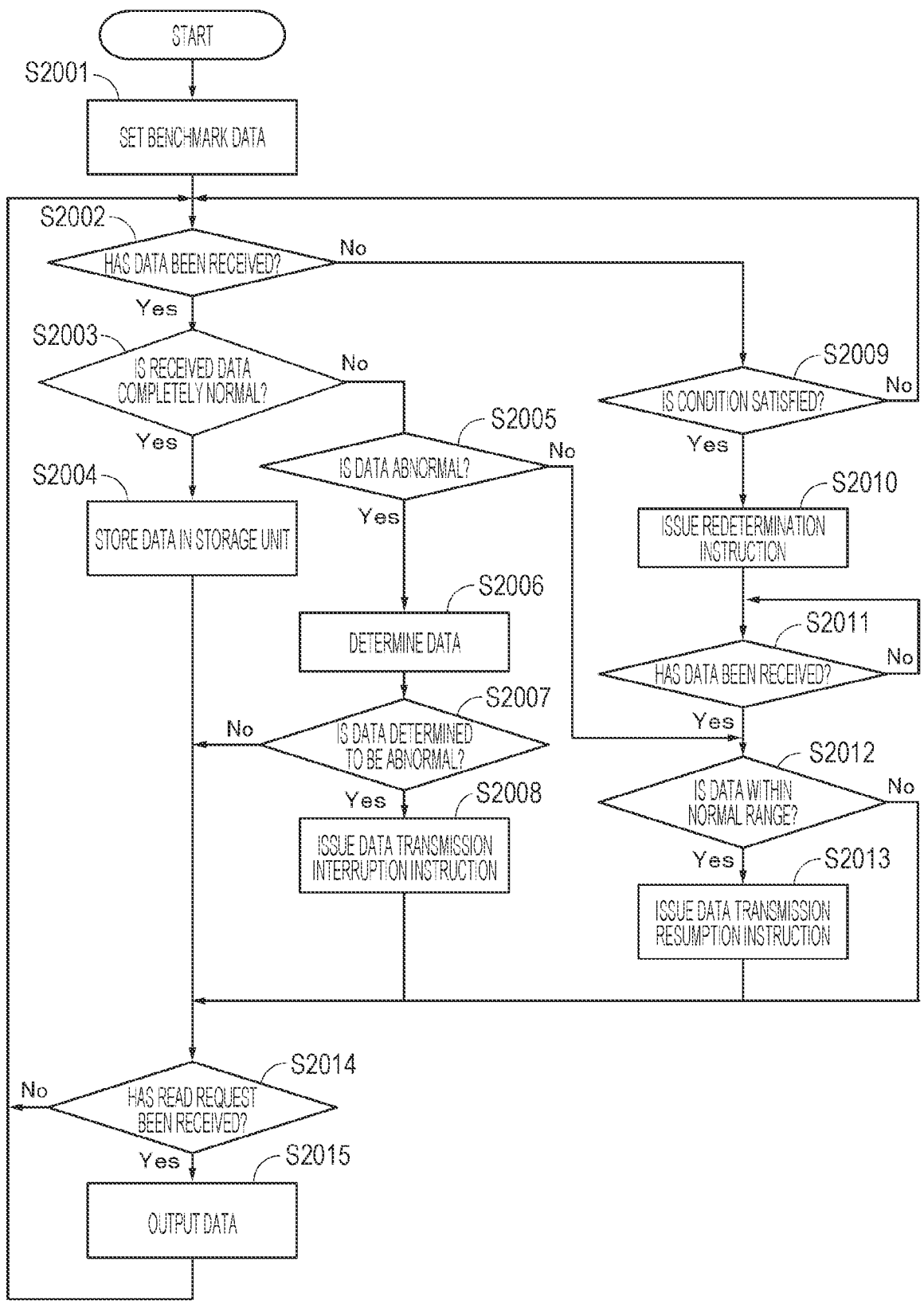

Next, processing in the receiving apparatus 200 will be described with reference to a flowchart of FIG. 12. First, in step S2001, benchmark data for data determination is decided and set in the data determination unit 206. Note that the benchmark data may be set by the user of the data processing system 10 inputting it, by default, or by the sensor apparatus 100 selecting past data. The benchmark data may be the same as or different from the benchmark data set in the sensor apparatus 100. Setting the benchmark data that is stricter than that in the sensor apparatus 100 allows the receiving apparatus 200 to correct a data determination result by determining that data erroneously determined to be normal by the sensor apparatus 100 is abnormal.

Next, in step S2002, it is checked whether or not data transmitted from the sensor apparatus 100 has been received. If the data has been received, the processing proceeds to step S2003, and it is checked whether or not the received data is completely normal. "Completely normal" means a state where both the sensor apparatus 100 and the receiving apparatus 200 have determined that the data is normal. Whether or not the received data is completely normal can be checked by checking whether or not the state information indicating that the data is abnormal is added. If there is no state information indicating that the data is abnormal, the data is normal. If the received data is normal, the processing proceeds to step S2004, and the receiving apparatus 200 stores the data in the storage unit 203.

Meanwhile, if the received data is abnormal in step S2003 (NO in step S2003), the processing proceeds to step S2005, and the data determination unit 206 determines the state of the data. Then, if the data is neither completely normal data nor abnormal data (NO in step S2005), the processing proceeds to step S2012 for a process for receiving normal range data.

If the data is above data in step S2005 and further determined to be abnormal by the data determination unit 206 of the receiving apparatus 200 in step S2006 (YES in step S2007), the processing proceeds from step S2007 to step S2008, and the data transmission interruption instruction is issued to the sensor apparatus 100. This is because, as described above, in a case where the receiving apparatus 200 receives the state information indicating that the data is abnormal from the sensor apparatus 100 and itself also determines that the data is abnormal, the receiving apparatus 200 causes the data transmission to be interrupted because the data is not to be transmitted to the receiving apparatus 200. Meanwhile, if the receiving apparatus 200 determines that the data is not abnormal (NO in step S2007), the sensor apparatus 100 is not required to interrupt the data transmission, and is thus not instructed to interrupt the data transmission.

The description returns to step S2002. If no data has been received from the sensor apparatus 100 in step S2002 (NO in step S2002), the processing proceeds to step S2009, and it is checked whether or not a predetermined condition is satisfied. As described above, the predetermined condition is elapse of a predetermined time interval or the like. This check can be performed by measuring time with the timer 208. If the predetermined condition is not satisfied, the processing returns to step S2002, and it is checked whether the data has been received from the sensor apparatus 100.

If no data has been received from the sensor apparatus 100 and the predetermined condition is satisfied (YES in step S2009), the processing proceeds to step S2010, and the data redetermination instruction is issued to the sensor apparatus 100.

Next, in step S2011, it is checked whether the data has been received from the sensor apparatus 100. If the data has been received, next, it is determined whether the received data is within a normal range in step S2012. If the data is within the normal range (YES in step S2012), the processing proceeds to step S2013, and the data transmission resumption instruction is issued to the sensor apparatus 100.

Furthermore, in addition to a series of processes described above, if there is a request from the user of the data processing system 10 for reading data stored in the storage unit 203 as illustrated in step S2014, the requested data is output in step S2015. Examples of an output method include display on the display unit 205.

The processing in the receiving apparatus 200 is performed as described above.

According to the present technology, it is possible to switch between interrupting and resuming transmission of detected data in accordance with the state of the sensor apparatus 100 or the state of the data detection target while the data detection is continued in the sensor apparatus 100. In addition, even when a malfunction of the sensor apparatus 100 or a change in the environment causes temporary abnormality in the data that is detected and transmitted to the receiving apparatus 200 by the sensor apparatus 100, the sensor apparatus 100 continues the data detection and thus can recognize by itself that the data returns to normal. Then, if returning to normal, the data can be transmitted to the receiving apparatus 200 again. Thus, the case where abnormality occurs in the data does not immediately cause the sensor apparatus 100 to be deactivated or the data to be discarded, so that the sensor apparatus 100 can be used again if the data returns to normal.

In addition, it is possible to notify the receiving apparatus 200 of a possibility that the normal data is being collected as a result of elimination of the malfunction of the sensor apparatus 100 or improvement in the environment, and to restore the system as necessary.

Judging on the sensor apparatus 100 side that the data detected by the sensor apparatus 100 is abnormal prevents the entire data processing system 10 from stopping even when only the sensor apparatus 100 malfunctions temporarily.

Even when the sensor apparatus 100 placed where installation is difficult temporarily has a malfunction or a change in the environment, the sensor apparatus 100 is not required to be installed again since the data processing system 10 can be restored without replacing the sensor apparatus 100 if the data returns to normal thereafter.

Detection only by the sensor unit 105 constituting the sensor apparatus 100 allows for monitoring a recovery state of the data abnormality, so that power consumption necessary for the communication between the sensor apparatus 100 and the receiving apparatus 200 can be suppressed.

If the data is abnormal, the sensor apparatus 100 continuously detects the data but does not transmit the abnormal data to the receiving apparatus 200. This configuration prevents a lot of unnecessary data from being transmitted via the communication network, and thus can inhibit the data from adding pressure on the communication network even in a case where there are many sensor apparatuses 100. As a result, the communication network can be efficiently used.

Since the abnormal data is not transmitted from the sensor apparatus 100 to the receiving apparatus 200, there is also an effect that unnecessary communication is suppressed and an operator who has installed the sensor apparatus 100 can save communication cost.

Note that, as an application example, a configuration is possible where a range of the data to be detected by the sensor apparatus 100 is set in advance and the data within that range is transmitted to the receiving apparatus 200 when being detected. For example, in a case where the rainfall sensor measures the rainfall, a configuration can also be implemented where, when there is no rainfall, the data is not transmitted to the receiving apparatus 200, but when there is rainfall, the data is transmitted to the receiving apparatus 200 and when the rainfall disappears, the data is not transmitted to the receiving apparatus 200. Furthermore, in a case where a sensor measures snowfall accumulation, a configuration is possible where, when there is no snowfall accumulation, the data transmission is interrupted but the sensor unit 105 continuously operates for detection, and thus as soon as there is snowfall accumulation, the data is transmitted to the receiving apparatus 200 and the receiving apparatus 200 is notified of occurrence of snowfall accumulation.

2. Modification

The embodiment of the present technology has been specifically described above. However, the present technology is not limited to the above-described embodiment, and various modifications based on the technical idea of the present technology are possible.

The case where the data detected by the sensor apparatus 100 returns from the abnormal state to the normal state includes a case where the sensor apparatus is replaced with another sensor apparatus as well as the case where the malfunction of the sensor apparatus 100 itself is eliminated. In such a case, the original sensor apparatus is not required to resume the data transmission, and thus the receiving apparatus 200 transmits to the original sensor apparatus the data transmission interruption instruction instead of the data transmission resumption instruction. In order to implement this configuration, the receiving apparatus 200 performs, after determining that the data is normal, a process for determining whether or not the sensor apparatus has been replaced. Whether or not the sensor apparatus has been replaced can be determined from, for example, position information of the sensor apparatus, similarity between the data detected by the original sensor apparatus and the data detected by a new sensor apparatus, or the like.

The present technology can also have the following configurations.

(1)

A data processing system including:
    a sensor apparatus configured to determine a state of data that is detected, transmit the data in accordance with a determination result, and continue to detect the data regardless of the determination result; and
    a receiving apparatus configured to receive the data transmitted from the sensor apparatus.

(2)

The data processing system according to (1), in which the sensor apparatus is configured to, when determining that the state of the data is abnormal, transmit state information indicating that the data is abnormal to the receiving apparatus together with the data.

(3)

The data processing system according to (1) or (2), in which the receiving apparatus is configured to, in a case where the state information indicates that the state of the data is abnormal, determine the state of the data.

(4)

The data processing system according to (3), in which the receiving apparatus is configured to, when determining that the data is abnormal, instruct the sensor apparatus to interrupt transmission of the data.

(5)

The data processing system according to (2), in which the sensor apparatus is configured to, when receiving determination that the data is abnormal from the receiving apparatus, interrupt transmission of the data to the receiving apparatus while continuing to detect the data.

(6)

The data processing system according to (2), in which the sensor apparatus is configured to, when determining that the state of the data that is detected is within a normal range in a situation after the data is determined to be abnormal, transmit state information indicating that the data is within the normal range to the receiving apparatus together with the data.

(7)

The data processing system according to any one of (1) to (6), in which the receiving apparatus is configured to, in a case where the state information received from the sensor apparatus indicates that the data is within a normal range, determine the state of the data.

(8)

The data processing system according to (3), in which the receiving apparatus is configured to, when determining that the data is within a normal range in a situation after the data is determined to be abnormal in the sensor apparatus, instruct the sensor apparatus to resume transmission of the data.

(9)

The data processing system according to (5), in which the sensor apparatus is configured to, when being instructed by the receiving apparatus to resume the transmission of the data in a situation after the data is determined to be abnormal, resume the transmission of the data to the receiving apparatus.

(10)

The data processing system according to any one of (1) to (9), in which the receiving apparatus is configured to, when a predetermined condition is satisfied in a situation after the data from the sensor apparatus to the receiving apparatus is determined to be abnormal, instruct the sensor apparatus to transmit the data for determination.

(11)

The data processing system according to (7), in which the receiving apparatus is configured to, when determining the state of the data received from the sensor apparatus and determining that the data is within a normal range, instruct the sensor apparatus to resume transmission of the data.

(12)

The data processing system according to any one of (1) to (11), in which the receiving apparatus is configured to determine the state of the data and, when receiving the data of which the state is normal, store the data in a storage unit.

(13)

The data processing system according to (5), in which the sensor apparatus is configured to, when being instructed by the receiving apparatus to resume the transmission of the data, determine whether the data that is detected is normal and transmit the data to the receiving apparatus in accordance with a determination result.

(14)

The data processing system according to (5), in which the sensor apparatus is configured to set a detection timing for abnormal data after the data is determined to be abnormal.

(15)

A data processing method in a data processing system including a sensor apparatus and a receiving apparatus, the method including:
 by the sensor apparatus, determining a state of data that is detected, transmitting the data in accordance with a determination result to the receiving apparatus, and continuing to detect the data regardless of the determination result; and
 by the receiving apparatus, receiving the data transmitted from the sensor apparatus.

(16)

A program that causes a computer to execute a data processing method in a data processing system including a sensor apparatus and a receiving apparatus, the method including:
 by the sensor apparatus, determining a state of data that is detected, transmitting the data in accordance with a determination result to the receiving apparatus, and continuing to detect the data regardless of the determination result; and
 by the receiving apparatus, receiving the data transmitted from the sensor apparatus.

(17)

A sensor apparatus including:
 a sensor unit configured to detect data;
 a determination unit configured to determine a state of the data that is detected; and
 a communication unit configured to communicate with a receiving apparatus,
 the sensor apparatus being configured to transmit the data in accordance with a determination result of the determination unit and continue to detect the data regardless of the determination result.

(18)

A receiving apparatus including:
 a communication unit configured to receive data transmitted from a sensor apparatus; and
 a determination unit configured to determine a state of the data,
 the receiving apparatus being configured to transmit an instruction to the sensor apparatus in accordance with a determination result of the determination unit.

REFERENCE SIGNS LIST

100 Sensor apparatus
103 Communication unit
105 Sensor unit
106 Data determination unit
200 Receiving apparatus
203 Communication unit
206 Data determination unit

The invention claimed is:

1. A data processing system, comprising:
 a sensor apparatus configured to:
  detect data;
  determine a state of the detected data;
  transmit the detected data and state information to a receiving apparatus based on the determined state, wherein the state information indicates that the state of the detected data is abnormal;
  receive, from the receiving apparatus, a determination result that indicates the detected data is abnormal; and
  based on the reception of the determination result from the receiving apparatus, interrupt the transmission of the detected data to the receiving apparatus and continue the detection of the data;
 the receiving apparatus configured to receive the detected data transmitted from the sensor apparatus.

2. The data processing system according to claim 1, wherein the sensor apparatus is further configured to:
 determine that the state of the data is abnormal; and
 transmit the state information indicating that the data is abnormal to the receiving apparatus based on the determination that the state of the data is abnormal.

3. The data processing system according to claim 2, wherein the sensor apparatus is further configured to, in a case where the state of the detected data is within a normal range in a situation after the data is determined to be abnormal, transmit the state information indicating that the data is within the normal range to the receiving apparatus together with the detected data.

4. The data processing system according to claim 1, wherein the receiving apparatus is further configured to, in a case where the state information indicates that the state of the data is abnormal, determine the state of the data.

5. The data processing system according to claim 4, wherein the receiving apparatus is further configured to, based on the determination result that indicates that the data is abnormal, instruct the sensor apparatus to interrupt transmission of the data.

6. The data processing system according to claim 4, wherein the receiving apparatus is further configured to, in a case where the data is within a normal range in a situation after the data is determined to be abnormal in the sensor apparatus, instruct the sensor apparatus to resume transmission of the detected data.

7. The data processing system according to claim 6, wherein the sensor apparatus is further configured to, based on the instruction by the receiving apparatus to resume the transmission, resume the transmission of the detected data to the receiving apparatus.

8. The data processing system according to claim 6, wherein the sensor apparatus is further configured to:
 based on the instruction from the receiving apparatus to resume the transmission of the data, determine whether the detected data is within the normal range; and
 transmit the data to the receiving apparatus based on the determination that the detected data is within the normal range.

9. The data processing system according to claim 1, wherein the receiving apparatus is further configured to, in a case where the state information received from the sensor apparatus indicates that the data is within a normal range, determine the state of the data.

10. The data processing system according to claim 9, wherein the receiving apparatus is further configured to, in a case where the state of the data received from the sensor apparatus is within the normal range, instruct the sensor apparatus to resume the transmission of the detected data.

11. The data processing system according to claim 1, wherein the receiving apparatus is further configured to, in a case where a determined condition is satisfied in a situation after the data from the sensor apparatus to the receiving apparatus is determined to be abnormal, instruct the sensor apparatus to transmit the data.

12. The data processing system according to claim 1, wherein the receiving apparatus is further configured to:
   determine the state of the data; and
   in a case where the state of the data is within a normal range, store the data in a storage unit.

13. The data processing system according to claim 1, wherein the sensor apparatus is further configured to set a detection timing for abnormal data after the data is determined to be abnormal.

14. A data processing method, comprising:
   in a data processing system including a sensor apparatus and a receiving apparatus:
      detecting, by the sensor apparatus, data;
      determining, by the sensor apparatus, a state of the detected data;
      transmitting, by the sensor apparatus, the detected data and state information to the receiving apparatus based on the determined state, wherein the state information indicates that the state of the detected data is abnormal;
      receiving, from the receiving apparatus by the sensor apparatus, a determination result that indicates the detected data is abnormal;
      based on the reception of the determination result from the receiving apparatus, interrupting, by the sensor apparatus, the transmission of the detected data to the receiving apparatus and continuing the detection of the data; and
      receiving, by the receiving apparatus, the detected data transmitted from the sensor apparatus.

15. A non-transitory computer-readable medium having stored thereon computer-executable instructions, that when executed by a processor, cause the processor to execute operations, the operations comprising:
   in a data processing system including a sensor apparatus and a receiving apparatus:
      detecting, by the sensor apparatus, data;
      determining, by the sensor apparatus, a state of the detected data;
      transmitting, by the sensor apparatus, the detected data and state information to the receiving apparatus based on the determined state, wherein the state information indicates that the state of the detected data is abnormal;
      receiving, from the receiving apparatus by the sensor apparatus, a determination result that indicates the detected data is abnormal;
      based on the reception of the determination result from the receiving apparatus, interrupting, by the sensor apparatus, the transmission of the detected data to the receiving apparatus and continuing the detection of the data; and
      receiving, by the receiving apparatus, the detected data transmitted from the sensor apparatus.

* * * * *